United States Patent [19]

Hidawa

[11] Patent Number: 4,802,839
[45] Date of Patent: Feb. 7, 1989

[54] APPARATUS FOR PRODUCING CAST PRODUCTS

[75] Inventor: Yoshiyuki Hidawa, Tokorozawa, Japan

[73] Assignee: Yoshiyuki Corporation, Tokyo, Japan

[21] Appl. No.: 25,534

[22] Filed: Mar. 13, 1987

[30] Foreign Application Priority Data

| Mar. 20, 1986 | [JP] | Japan | 61-63671 |
| Jul. 28, 1986 | [JP] | Japan | 61-177361 |
| Jul. 28, 1986 | [JP] | Japan | 61-177362 |

[51] Int. Cl.4 .......................................... B28B 13/00
[52] U.S. Cl. ................................... 425/439; 249/127;
264/313; 264/314; 425/440; 425/DIG. 14;
425/DIG. 44
[58] Field of Search ....................... 249/127, 152, 153;
264/45.2, 313, 314, DIG. 78; 425/51, 255, 405
H, 422, 437–440, DIG. 14, DIG. 44, 60, 112

[56] References Cited

U.S. PATENT DOCUMENTS

| 1,968,887 | 8/1934 | Hansen | 264/306 |
| 2,124,871 | 7/1938 | Beal | 425/DIG. 44 |
| 2,182,454 | 12/1939 | Sherman | 249/127 |
| 2,378,701 | 6/1945 | Habib et al. | 264/301 |
| 2,660,776 | 12/1953 | Miller | 249/55 |
| 3,306,965 | 2/1967 | Lucas et al. | 264/306 |
| 3,677,674 | 7/1972 | Bowles | 425/405 H |
| 3,730,666 | 5/1973 | Bowles | 425/405 H |
| 3,806,302 | 4/1974 | Airey | 425/DIG. 44 |
| 3,815,863 | 6/1974 | Andeweg | 425/DIG. 44 |
| 3,980,269 | 9/1976 | Maurino et al. | 425/DIG. 44 |
| 3,982,721 | 9/1976 | Maurino et al. | 425/DIG. 44 |
| 4,044,161 | 8/1977 | Tanara | 249/127 |
| 4,051,296 | 9/1977 | Windecker | 264/225 |
| 4,055,620 | 10/1977 | Conrad | 425/DIG. 44 |
| 4,093,175 | 6/1978 | Putzer et al. | 249/153 |

Primary Examiner—Jay H. Woo
Assistant Examiner—C. Scott Bushey
Attorney, Agent, or Firm—Armstrong, Nikaido, Marmelstein & Kubovcik

[57] ABSTRACT

Apparatus for producing cast products comprises a filling unit wherein non-solid materials are filled into open-bag shaped elastic moulds through filling nozzles, a solidifying unit wherein the material is solidified in the elastic mould, and a withdrawal unit wherein the solidified product is removed from the inside of the elastic mould. The apparatus can produce cast products with high commercial values and low production costs.

5 Claims, 5 Drawing Sheets

FIG.8
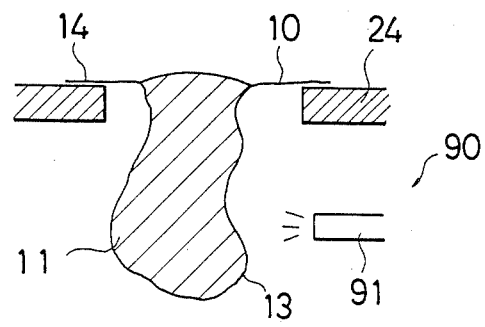
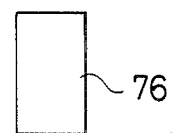
FIG.10
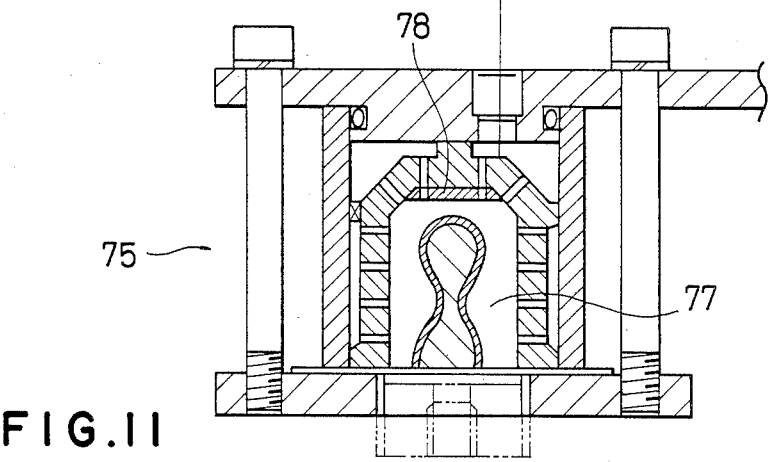
FIG.11
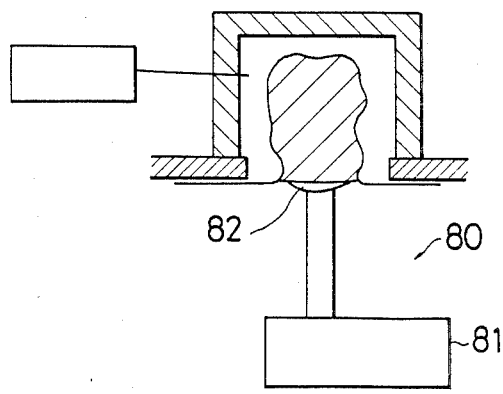

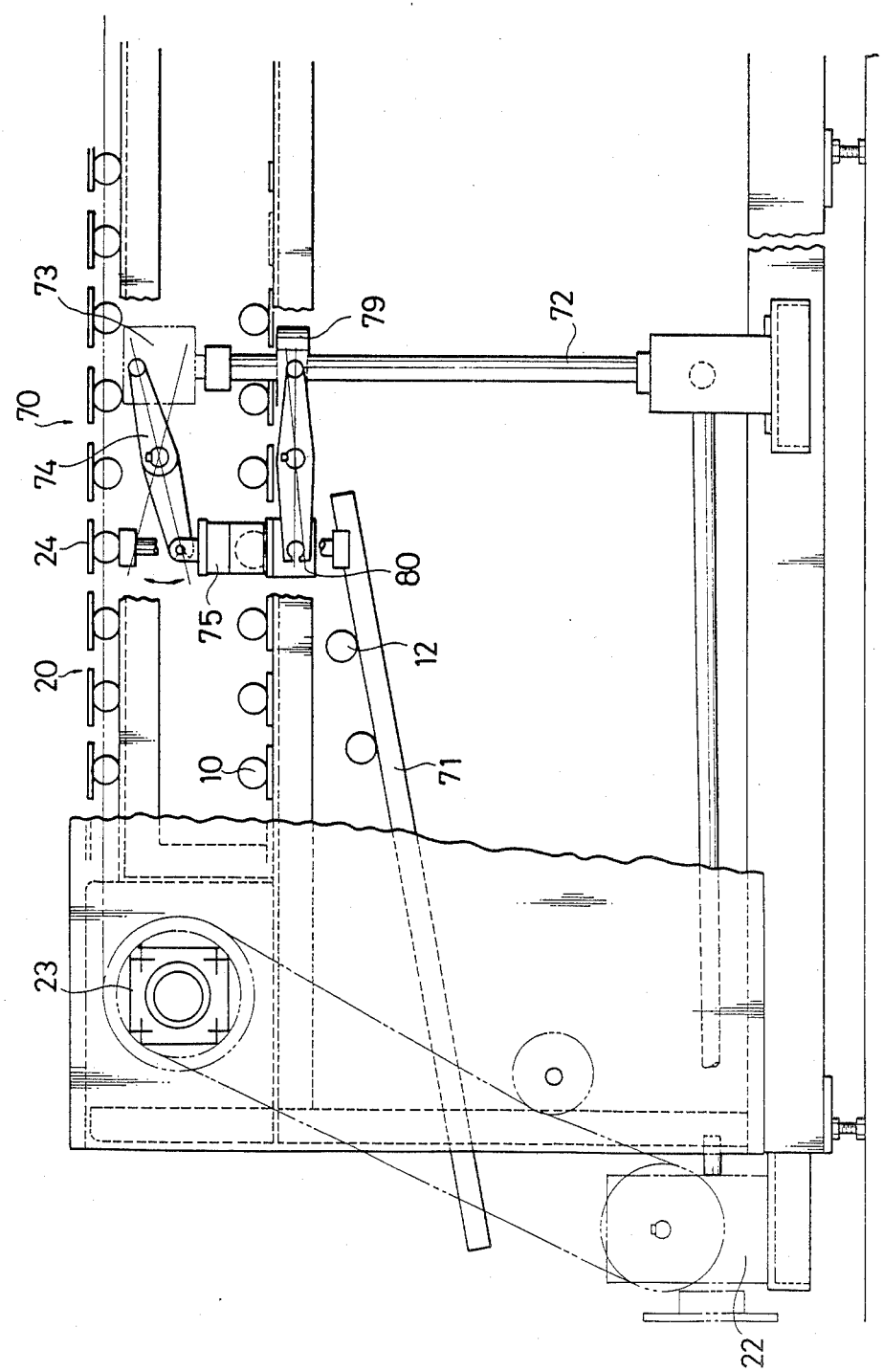

ABSTRACT# APPARATUS FOR PRODUCING CAST PRODUCTS

BACKGROUND OF THE INVENTION AND RELATED ART STATEMENT

The present invention relates to apparatus for producing cast products and in particular to apparatus in which non-solid materials such as water, chocolate, fish cake, fish paste and rubber for erasers are filled in an elastic mould of open-bag shape, and then are solidified to yield products.

A variety of materials including food-stuffs have been produced by means of moulding. Conventional mould have been constructed of a plurality of split moulds made of a rigid body. According to these conventional methods, materials are first filled into the split moulds to allow to solidify inside the moulds, and then withdrawn by separating the split moulds.

These split moulds, however, tend to leave the joint of the mould on the surface of the product thus formed, resulting in lower product values. A large number of moulds and complicated production steps are required especially when products of complicated shapes are desired to be formed. Furthermore, since the split mould is made of a rigid body, the manufacture of the split mould itself is so expensive that the product cost tends to be high. Especially when a variety of product types but small production rates are necessary, the cost of the split mould occupies a greater part of the total cost of the product, and this almost prohibits the actual production of desired products. In addition, the split mould made of a rigid body often breaks under a high pressure or a vacuum which may be applied to the mould when a material solidifies whose volume changes with temperatures of the solidification step.

OBJECTS AND SUMMARY OF THE INVENTION

An object of the present invention is to provide apparatus for producing materials by the use of moulds, wherein the use of an elastic mould of open-bag shape permits the production of cast materials without having such a joint as appears in a split mould.

Another object of the invention is to provide cast material producing apparatus which can accomplish the manufacturing cost reduction of the mould itself, the prevention of the mould damage, and the greater degree of simplification in production steps.

A further object of the invention is to provide apparatus for producing materials by the use of moulds, wherein materials can be filled without developing any air bubbles in spite of higher or lower viscosity of the materials.

The present invention is provided to solve the aforementioned problems and the apparatus according to the present invention comprises a filling unit wherein elastic moulds of open-bag shape are filled with non-solid materials through filling nozzles, a solidifying unit wherein the materials are allowed to solidify in the elastic moulds, and a withdrawal unit wherein the solidified materials are withdrawn from the inside of the elastic moulds.

According to the apparatus of the present invention, materials are first filled into elastic moulds in a filling unit. Elastic moulds are used because filled or solidified materials are withdrawn by expanding or contracting the moulds in the filling unit or the withdrawal unit.

Filling is desirably carried out so that no air bubbles are left in the elastic moulds. When the filling materials are of low viscosity, for example, water, or the shape of the elastic mould is simple, the materials can be directly filled into the elastic mould. However, when the viscosity is high or the shape of the elastic mould is complicated, air bubbles are likely to form in the materials filled simply through the nozzle.

According to the present invention, air bubble entrainment can be prevented by lifting the nozzle which has been placed at the bottom of the elastic mould as the level of the filling material increases, and by deflating the elastic mould which has been expanded to receive the filling materials. Alternatively, the filling nozzle is brought into close contact with the elastic mould by a sucking action of a vacuum or a pushing action of a high pressure. Thus, products of perfect quality can be obtained in accordance with the present invention.

After being filled into the elastic mould, the material is then solidified in the solidifying unit, which may be a heating or refrigeration unit, depending on the property of the filling material.

Then, the material thus solidified in the inside of the elastic mould is removed by expanding the elastic mould in the withdrawal unit. A vacuum can be developed in the opposite side of the entrance of the elastic mould in order to expand the elastic mould to withdraw the product. In addition, the product can be removed by pushing it from the opposite side of the entrance.

BRIEF DESCRIPTION OF THE DRAWINGS

The drawings illustrate an embodiment of the present invention.

FIG. 8 is a schematic illustration to show a smoothing unit.

FIG. 9 is a cross-sectional view of a withdrawal unit.

FIG. 10 is a cross-sectional view of a vacuum unit.

FIG. 11 shows a schematic view of another embodiment of the withdrawal unit.

DETAILED DESCRIPTION OF PREFERRED EMBODIMENTS

Figure 1:
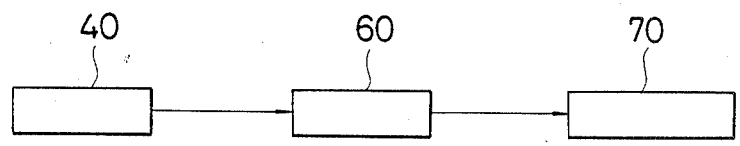
FIG. 1 is a block diagram of apparatus according to the present invention.
Figure 2:
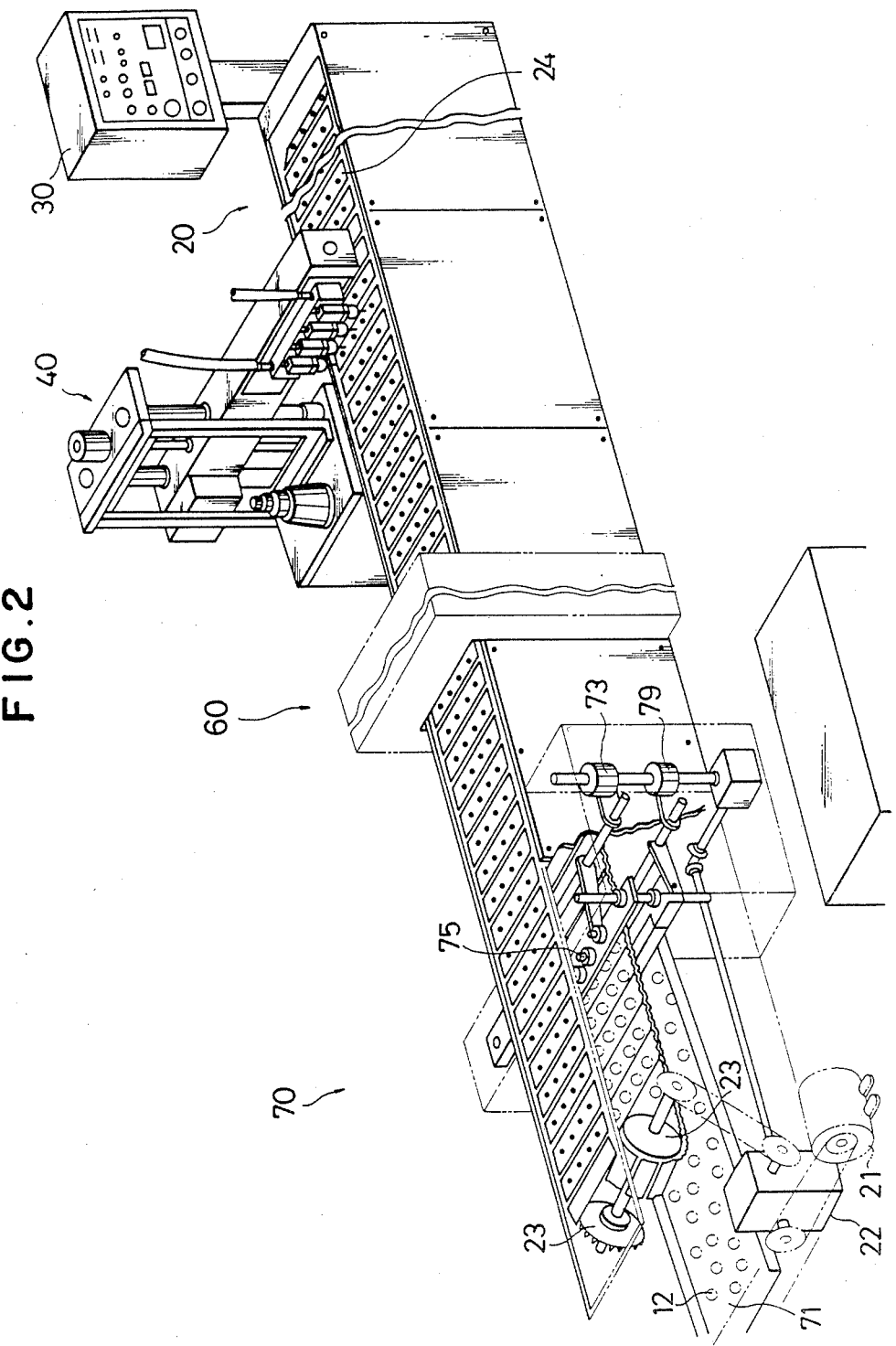
FIG. 2 is a perspective view of the apparatus.

Embodiments of the invention will be described hereinafter with reference to the drawings. FIG. 1 is a block diagram to depict the configuration of the apparatus. FIG. 2 is a partial perspective view.

The present invention comprises a filling unit 40 wherein a filling material 11 is filled into an elastic mould 10, a solidifying unit 60 wherein the material 11 filled in the elastic mould 10 is solidified, and a withdrawal unit 70 wherein the filling material 11 solidified in the inside of the elastic mould 10 is withdrawn. These units are successively arranged along a transfer conveyor 20, and are controlled by means of a control unit 30.

The transfer conveyor 20 is driven by a pulley 23 connected with a motor 21 via a reducer 22 and intermittently travels between each unit at a velocity preset with the control unit 30. In addition, a number of fixing sheets 24 fixed in the conveyor 20 are placed parallel to each other in the direction of conveyor travel. Each fixing sheet has a fixing hole 25 larger than the size of the final product 12.

The elastic mould 10 comprises an open-bag shaped filling section 13 and a fixing member 14 formed near the open edge of the filling section 13. The shape of the filling section 13 is spherical, cylindrical, or patterns of animals and specific characters to form the products of the desired shape.

Figure 3:
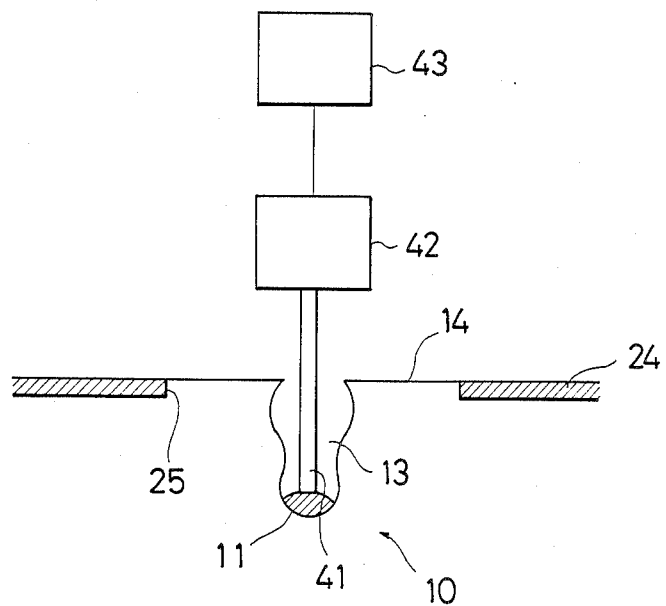
FIGS. 3 to 7 are schematic illustrations to depict filling units.
Figure 4:
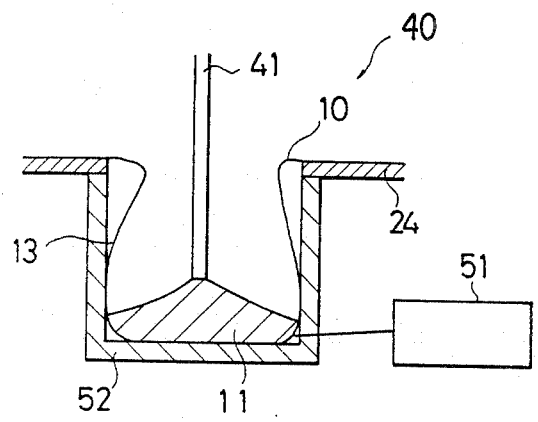
Figure 5:
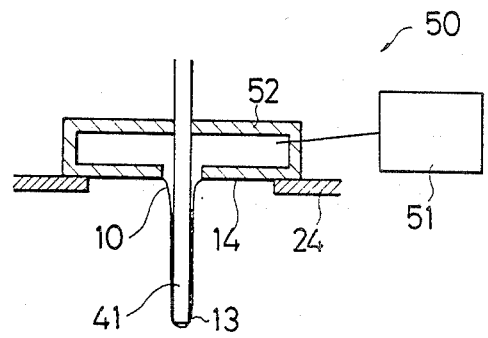

The fixing member 14 is a flange extending from the filling section 13 and fixed in the fixing sheet 24 of the transfer conveyor 20. Furthermore, it is desired that the fixing member 14 is somewhat thicker than the filling section 13 since only the filling section 13 is expanded when expansion is carried out in the filling unit 40 or the withdrawal unit 70. FIGS. 3 to 8 are provided to illustrate these units individually. FIGS. 3 to 5 illustrate embodiments of the filling unit 40.

When the filling material 11 is a low-viscosity material such as water, the filling material 11 can be directly filled into the filling section 13 of the elastic mould 10 through the filling nozzle 41 of a filling mechanism 42 positioned above the open edge of the elastic mould 10. After the filling nozzle 41 of the filling mechanism 42 has filled the material 11 into the elastic mould 10, the next fixing sheet 24 succesively moves under the filling nozzle 41 by the intermittent movement of the transfer conveyor 20 in order to continue filling operation.

However, when the filling material 11 is of high-viscosity, such direct filling as mentioned above causes air entrapment internally of the filling section 13 of the elastic mould 10, resulting in a solidified product with cavities. This can be solved by an arrangement shown in FIG. 3 where the filling unit 40 consists of a filling mechanism 42 and a vertical motion mechanism 43 positioned above the filling mechanism 42. In this configuration, the filling nozzle 41 of the filling mechanism 42 is lowered in the vicinity of the bottom of the filling section 13 of the elastic mould 10 over the transfer conveyor 20 by means of the vertical motion mechanism 43 to fill the mould partly, and then is lifted slowly by the action of the vertical motion mechanism 43 while filling the material, depending on the amount of the filling material.

Therefore, in this configuration, there must be a certain corresponding relationship between a filling velocity of the filling mechanism 42 and a upward velocity of the vertical motion mechanism 43. In addition, whenever an elastic mould 10 whose cross-sectional areas vary as the height changes is used, both of the aforementioned velocities must be changed. This velocity change can be accomplished with cam devices. Since the change of cam devices in conjunction with the change of elastic moulds is troublesome, it is desired that the two variables, a rate of the filling material per unit time and a velocity of the vertical motion is simultaneously controlled by a programmable control system.

Alternatively, the filling mechanism 42 can stay in its original position while the elastic mould 10 is moved up and down by the vertical motion mechanism 43.

When such units or components are assembled in a production line, the elastic mould 10 can stay to be filled by the filling unit 40 and then can be transferred intermittently after completing the filling operation. Alternatively the filling unit 40 can be transferred along the production line to fill the filling material 11 from the filling unit 40.

However, when the viscosity of the filling material 11 is much higher, the aforementioned operation of lifting the filling nozzle 41 while filling the material 11 is not satisfactory since air bubbles are often trapped in the inside of the filling section 13.

A variety of designs can be made with respect to the elastic mould 10 even in such cases. FIG. 4 shows a filling device 40 where filling starts after the elastic mould 10 is expanded by applying a vacuum from the opposite side of the filling nozzle 41. In this device, a vacuum mechanism 52 connected with a vacuum source 51 is placed on the fixing sheet 24 of the elastic mould 10 and located at the opposite side of the filling nozzle 41. And, before filling the material 11, the elastic mould 10 is expanded by applying a vacuum in the inside of the vacuum mechanism 52. Thus, the material 11 is filled into the inside of the elastic mould 10 while the elastic mould 10 is kept expanded.

The amount of the material 11 to be filled should be the same amount of the material as would be adequately filled in a non-expanded elastic mould 10 and the material 11 occupies only half the level of the elastic mould 10 which is in an expanded state.

After the material 11 has been filled into the inside of the elastic mould 10, the pressure inside of the vacuum mechanism 52 is slowly returned to an atmospheric pressure by adjusting the vacuum source 51. Then, the material 11 starts filling the inside of the elastic mould 10 which is on the way of returning to the original state, resulting in preventing air bubbles from being trapped in the inside of the elastic mould 10.

As another embodiment using such a filling unit 40, the following operation can be made. That is, about half the required amount of the material 11 is filled into the expanded elastic mould 10, which is then returned to the original state and the remaining amount of the material 11 is then filled after the mould has been expanded again. And, the mould is returned to the normal state. This operation also prevents air bubbles being trapped inside the elastic mould 10.

As a further embodiment, the following operation can be made. That is, about half the required amount of the material 11 is filled into the expanded elastic mould 10 by a primary filling unit, and then the elastic mould 10 is returned to the original state. The elastic mould 10 is then squeezed a little from both sides with a pushing unit (not shown) to push the air out, and is again expanded. The remaining amount of the material 11 is then filled with a secondary filling unit and the mould is again returned to the original state. When this operation using such a filling unit 40 is employed, all the units are preferably transferred intermittently because the primary filling unit, the pushing unit, and the secondary filling unit are all successively operated.

Figure 6:
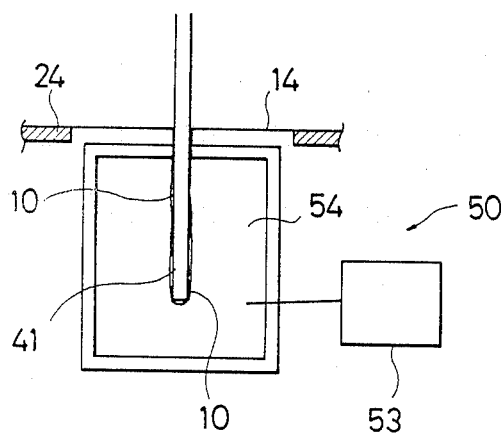

FIGS. 5 and 6 show other embodiments of the filling unit 40. Elasticity of the mould 10 enables the filling section 13 to be intimately contacted with the filling nozzle 41 by use of a contact unit 50. When filling starts from this condition, air bubble contamination can be avoided.

FIG. 5 shows an embodiment in which a vacuum mechanism 52 connected with a vacuum source 51 is placed above a fixing sheet 24 and the filling section 13 is contacted with the filling nozzle 41 by acting this vacuum mechanism 52.

FIG. 6 also shows an embodiment in which a high pressure mechanism 54 connected with a high pressure source 53 is placed underneath a fixing sheet 24, and the filling section 13 is contacted with the filling nozzle 41 by acting this high pressure mechanism 54.

In either of the embodiments shown above, an elastic filling section 13 is contacted with the filling nozzle 41 when the filling nozzle 41 starts filling the material 11 into the inside of the filling section 13. Hence, there exists no air between the filling nozzle 41 and the filling section 13. The filling operation of the material 11 without trapping air bubbles thus can be made by starting filling the material 11 from this state at a pressure higher than that developed in the vacuum source 51 or the high pressure source 53.

When the material 11 is filled with a filling unit 40, an elastic mould 10 sometimes deforms, depending on the filling pressure used. The deformation of this type can be prevented by positioning a suitable jig (not shown) underneath the elastic mould 10 when filling operation is carried out.

Figure 7:
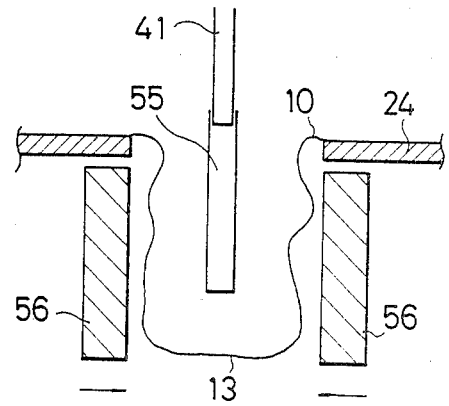

FIG. 7 shows another embodiment in which a flexible tube 55 is attached to the filling nozzle 41. The filling operation is made in such a manner that an elastic mould 10 is crushed with a pushing mechanism 56 so that the flexible tube 55 can also be crushed, and from this state the material 11 is filled at a pressure a little higher than that of the pushing mechanism 56. This operation also permits air-bubble free filling into the inside of the elastic mould 10.

FIG. 8 depicts an embodiment of a smoothing unit 90 for the bottom of the final product. After the material 11 has been filled into the inside of the elastic mould 10, pressurized air from an air nozzle 91 of the smoothing unit 90 shakes the elastic mould 10 from side to side. Thus, the surface of the material 11 in the vicinity of the open edge of the elastic mould 10 can be smoothed. The smoothing operation provides a stable bottom for the product 12 which is often displayed for sale on a table. Alternatively, instead of using pressurized air, the elastic mould 10 can be shaked from side to side using tapping members.

A solidifying unit 60 is used to solidify a filling material 11 inside the elastic mould 10. This unit is composed of a heating mechanism, a cooling mechanism, a combination of these mechanisms, or other mechanisms. The specific configuration of the solidifying unit 60 is dependent on the material of which the filling material 11 is made. When the filling material 11 is a substance which can solidify upon cooling, for example, water, the solidifying unit 60 can be a cooling unit. Conversely, when the filling material 11 is a substance which can solidify upon heating, for example, fish paste, or rubber for an eraser, the solidifying unit 60 can be a heater unit.

When the filling material 11 is a food stuff, cooking is often necessary as well as the step of solidifying the material 11, and a cooking unit can be used in combination with the solidifying unit. According to the present invention, the mould 10 is elastic, and it will never break upon solidification in the solidifying unit 60 even if the material 11 changes in its volume. When the mould is made of a rigid body, it sometimes breaks because of such internal pressure increase as encountered in water solidification by cooling. In the present invention, however, no damage or rupture will occur because the elastic mould 10 can expand as the volume increases.

FIGS. 9 and 10 show withdrawal units 70 where the solidified product 12 is withdrawn from the inside of the filling section 13 of the elastic mould 10. In such a withdrawal unit 70, the product 12 can be pushed out by pushing the product 12 from the opposite side of the open edge of the elastic mould 10 because of its elasticity. Alternatively, the open edge can be extended by an external force before the product 12 is pushed out from the opposite side of the open edge.

However, a part of the product 12 which is corresponding to the opposite side of the open edge sometimes deforms because of the pushing force. Thus, the following withdrawal unit 70 can be used where no single part of the product 12 is affected by an external force.

In such a withdrawal unit 70, the filling section 13 located underneath the fixing sheet 24 of the transfer conveyor 20 is turned around by a pulley 23 to be positioned above the fixing sheet 24, and the product 12 inside the mould is allowed to fall to a withdrawal conveyor 71 located below by expanding the filling section 13. Alternately, the product 12 can be withdrawn when the filling section 13 is in a horizontal position.

The withdrawal unit 70 of this type comprises a rotating axis 72 rotated with a motor 21, a vacuum cam 73 fixed on the rotating axis 72, a transmission rod 74 shaked by vacuum cam rotation, and a vertically movable vacuum unit 75 placed on the edge of the transmission rod 74. The rotating axis 72 is rotated synchronously with each of other units with the same motor 21 that is used to drive the transfer conveyor 20. The vacuum cam 73 serves as a front cam fixed on the rotating axis 72. The vacuum unit 75 is connected with a vacuum source 76, and is used to keep a vacuum chamber 77 inside the vacuum unit 75 in a vacuum state. The vacuum source 76 is composed of a vacuum valve, a rupture valve and a compressor (detailed drawings are not shown). The vacuum chamber 77 has a size to cover the upper side filling section 13 in which the product 12 is contained, and a cushion 78 is placed on the upper surface of the inside of the chamber.

The action of such a withdrawal unit 70 is as follows. First, the material 11 inside the filling section 13 is solidified in the solidifying unit 60, and then turned round by the pulley 23. Then, the transfer conveyor 20 intermittently moves so that the filling section 13 containing the solidified product 12 is positioned above the fixing sheet.

The vacuum chamber 77 then covers the filling section 13, and the inside of the vacuum chamber 77 is vacuumed by the vacuum source 76. Thus, the elastic mould 10 made of an elastic body expands so that it contacts with the inside wall of the vacuum chamber 77. At the same time the fixing member 14 as well as the filling section 13 of the elastic mould 10 comes in intimate contact with the inside of the vacuum chamber 77, and an open edge is thus formed around the fixing hole 25 of the fixing sheet 24. In the embodiment as shown, the fixing member 14 is thicker than the filling section 13, and the filling section expands in a greater degree. This makes it easier to withdraw the final product 12 from the mould.

Then, the product 12 leaves the elastic mould 10 and falls down through the fixing hole 25 of the fixing sheet 24, which is larger than the product 12. The product 12 is then transferred to a specified position by the withdrawal conveyor 71 placed below the withdrawal unit 70.

When a vacuum is applied to the mould positioned as described above, the filling section 13 elongates in the upward direction in the case of the embodiment as shown, and may collide with the upper surface of the inside of the vacuum chamber 77 to result in deformation. In the embodiment as shown above, however, a cushion 78 is attached to the upper surface of the inside of the vacuum chamber 77 to prevent such deformation.

In the drawing, a guide cam 79 is fixed on the rotating axis 72, and is used for providing a vertical motion for a guide unit 80, which is used to withdraw the product 12 falling from the filling section 13 and to guide the product into the conveyor 71.

Although the drawing provides a cylindrical vacuum chamber 77 with an end cap, a totally or partially tapered chamber (not shown) is desirable because such shape permits a free falling of the product 12 from the inside of the vacuum chamber 77.

As to a cast product 12 which is hard to be withdrawn with such a withdrawal unit 70, another embodiment as shown in FIG. 11 is suitable in which the guide unit 80 is equipped with a vertical motion unit 81 and a vacuum sucking unit 82 and the cast product 12 is forced to be withdrawn from the elastic mould 10.

Such an operation will be described more in detail hereinafter. First, the vacuum sucking unit 82 of the guide unit 80 is positioned close to the cast product 12 that has been solidified inside the elastic mould 10 before vacuum sucking is actually carried out. Then, a vacuum is applied to the inside of the vacuum chamber 77 with the vacuum source 76, and the elastic mould 10 is allowed to expand in the vacuum chamber 77. Hence, the cast product 12 is withdrawn from the elastic mould 10 while the cast product 12 is kept to have been sticked to the vacuum sucking unit 82.

Furthermore, the vertical motion unit 81 shown in FIG. 11 then provides a small stroke of upward motion after the vacuum-sucking unit 82 of the guide unit 80 is positioned close to the cast product 12 for vacuum-sucking. Then, air is introduced between the elastic mould 10 and the cast product 12 and the withdrawal of the product 12 from the elastic mould 10 is firmly accomplished by expanding the elastic mould 10 inside the vacuum chamber 77 in the presence of the air thus introduced.

According to various experimental results in case of producing ice as a cast product 12, it has been proved that the elastic mould 10 be made of rigid latex with thicknesses of 0.5 to 0.8 mm, and 0.8 to 1.1 mm for the filling section 13 and the fixing section, respectively. With this dimension, a removal-and-falling-from-mould time of 0.5 to 1.0 seconds was confirmed at a vacuum pressure of about 500 mmHg.

Since the whole shape of the cast product 12 thus produced is determined by that of the filling section 13 of the elastic mould 10, any shapes of cast products 12 can be produced by preparing a variety of elastic moulds.

Compared with those moulds made of a rigid body, the elastic mould 10 can be mass-produced at low costs. In addition to the cost advantage of the cast product 12, the product of this invention has no such joint as appears in that produced by means of a split mould, resulting in a natural-looking and high-value product. Furthermore, simplification of production steps can be made because no split into a plurality of directions of the mould is required.

According to the present invention, the elastic mould 10 can expand and contract as the volume of the filling material 11 changes in the solidification step in the solidification unit 60. Hence, the elastic mould 10 will not break at all. Furthermore, the shape of the product 12 will not be damaged in the withdrawal unit 70 since a vacuum is used to withdraw the product gently.

It should be noted that the elastic mould 10 of this invention can be any elastic material which includes soft rubber and soft plastic. As described in detail herein, the open-bag shaped elastic mould of the present invention provides products without joints, low production costs of the mould itself, prevention of mould breakage as well as a greater degree of production step simplification. Furthermore, regardless of the viscosity of the filling material, it can be filled into the elastic mould of the present invention without air bubbles trapped in the material.

What is claimed is:

1. Apparatus for producing cast products which comprises a filling unit wherein a non-solid material is filled into elastic moulds having open bag shaped interior filling sections, said filling unit including filling nozzles insertable internally of said filling sections of said elastic moulds, a source of high fluid pressure, and means for applying said high fluid pressure to an exterior surface of said elastic mould filling sections to collapse said filling sections into surrounding contact with said filling nozzles before said elastic moulds are filled in said filling unit, a solidifying unit wherein the filled material is solidified inside the elastic moulds, a withdrawal unit wherein a solidified product is withdrawn from the inside of said elastic moulds, said withdrawal unit including a movable vacuum chamber, and conveying means moving said elastic moulds sequentially from said filling unit to said solidifying unit to an inverted position at said withdrawal unit, and means for intermittently moving said vacuum chamber toward and away from the exterior of said inverted elastic moulds at said withdrawal unit, whereby said vacuum chamber covers the inverted filling section of said elastic moulds and expands said elastic moulds thereby permitting cast product removal in a downward direction and then moves away from said elastic moulds permitting movement of said elastic moulds by said conveying means.

2. Apparatus for producing cast products, which comprises a filling unit wherein a non-solid material is filled into elastic moulds having open bag shaped interior filling sections, a solidifying unit wherein the filled material is solidified inside the elastic moulds, a withdrawal unit wherein a solidifed product is withdrawn from the inside of said elastic moulds, said withdrawal unit including a vertically movable vacuum chamber, and conveying means moving said elastic moulds sequentially from said filling unit to said solidifying unit to an inverted position at said withdrawal unit, and means for intermittently moving said vacuum chamber toward and away from an exterior surface of said inverted elastic moulds at said withdrawal unit, whereby said vacuum chamber covers the inverted filling section of said elastic moulds from the upper side and expands said elastic moulds thereby permitting cast product removal in a downward direction and then moves away from said elastic moulds permitting movement of said elastic moulds by said conveying means.

3. Apparatus for producing cast products according to claim 2, wherein said elastic moulds are expanded by applying a vacuum externally of said filling sections before said moulds are filled in said filling unit.

4. Apparatus for producing cast products according to claim 2, wherein said filling unit comprises a primary filling unit wherein less than the required amount of material is filled into said elastic moulds, a pushing unit wherein the partially filled moulds are pushed from side to side, and a secondary filling unit wherein the remaining amount of material is filled into said elastic moulds after the pushing unit is applied.

5. Apparatus for producing cast products according to claim 2, wherein said withdrawal unit further includes a vacuum-sucking unit for contacting cast products in the elastic moulds expanded by said vacuum chamber and withdrawing said cast products from said elastic moulds.

* * * * *